United States Patent
Sasaki et al.

(10) Patent No.: US 6,888,450 B2
(45) Date of Patent: May 3, 2005

(54) TIRE CONDITION INDICATING SYSTEM FOR WHEELED VEHICLE

(75) Inventors: Kaoru Sasaki, Shizuoka (JP); Yoshiaki Uchida, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 0 days.

(21) Appl. No.: 10/373,253

(22) Filed: Feb. 24, 2003

(65) Prior Publication Data

US 2004/0021561 A1 Feb. 5, 2004

(30) Foreign Application Priority Data

Jul. 31, 2002 (JP) ........................................ 2002-224113

(51) Int. Cl.[7] .............................. B60Q 1/00; B60R 25/10
(52) U.S. Cl. ........................ 340/445; 340/442; 340/447; 340/426.33; 73/146.5; 180/271
(58) Field of Search ................................. 340/445, 446, 340/447, 448, 442, 426.33; 116/34 R; 73/146.5; 180/271, 279

(56) References Cited

U.S. PATENT DOCUMENTS

| | | | | |
|---|---|---|---|---|
| 4,131,877 A | * | 12/1978 | Stewart et al. ........... | 200/61.25 |
| 4,163,208 A | | 7/1979 | Merz ........................... | 340/447 |
| 4,384,482 A | | 5/1983 | Snyder ....................... | 73/146.5 |
| 5,081,443 A | * | 1/1992 | Breit ........................... | 340/438 |
| 5,500,637 A | * | 3/1996 | Kokubu ...................... | 340/447 |
| 5,853,020 A | | 12/1998 | Widner ....................... | 137/227 |
| 6,199,575 B1 | | 3/2001 | Widner ....................... | 137/227 |
| 6,232,875 B1 | * | 5/2001 | DeZorzi ..................... | 340/442 |
| 6,518,875 B2 | | 2/2003 | DeZorzi ..................... | 340/442 |
| 2002/0126005 A1 | | 9/2002 | Hardman et al. .......... | 340/442 |

FOREIGN PATENT DOCUMENTS

| | | |
|---|---|---|
| JP | 04-071911 | 3/1992 |
| JP | 5-189272 | 7/1993 |
| JP | 5-213121 | 8/1993 |
| JP | 5-235854 | 9/1993 |
| JP | 06-191247 | 7/1994 |
| JP | 6-219113 | 8/1994 |
| JP | 6-320923 | 11/1994 |
| JP | 7-81337 | 3/1995 |
| JP | 7-134077 | 5/1995 |
| JP | 7-205624 | 8/1995 |
| JP | 7-246810 | 9/1995 |
| JP | 07-251751 | 10/1995 |
| JP | 8-219920 | 8/1996 |
| JP | 8-263753 | 10/1996 |
| JP | 8-304205 | 11/1996 |

(Continued)

*Primary Examiner*—Donnie L. Crosland
(74) *Attorney, Agent, or Firm*—Knobbe, Martens, Olson & Bear, LLP

(57) ABSTRACT

A motor cycle incorporates a sensor detecting a condition of the tire, such as, for example, tire pressure. A transmitter transmits the tire condition and a receiver receives the tire condition. An indicator indicates the tire condition. A battery supplies electric power to an engine of the motorcycle, the receiver and the indicator. A control device controls the power supply to the engine, the receiver and the indicator from the battery. A main switch assembly and an activating switch, which activates the receiver and the indicator, are interposed between the battery and the control device. The control device allows power supply to the engine, the receiver and the indicator when the main switch assembly is turned on. The control device also allows power supply to the receiver and the indicator when the activating switch is turned on. In some arrangements, the activating switch is automatically turned on when another sensor detects a condition change of a frame assembly of the motorcycle.

21 Claims, 7 Drawing Sheets

FOREIGN PATENT DOCUMENTS

| | | |
|---|---|---|
| JP | 9-240446 | 9/1997 |
| JP | 9-323679 | 12/1997 |
| JP | 10-6809 | 1/1998 |
| JP | 11-20427 | 1/1999 |
| JP | 2881985 | 2/1999 |
| JP | 11-263107 | 9/1999 |
| JP | 11-334328 | 12/1999 |
| JP | 11-334664 | 12/1999 |
| JP | P3095914 | 8/2000 |
| JP | P3185524 | 5/2001 |
| JP | P2001-246914 A | 9/2001 |
| JP | P2001-322411 A | 11/2001 |
| JP | P2002-19434 A | 1/2002 |
| JP | 2002-59723 | 2/2002 |
| JP | P2002-59723 A | 2/2002 |

\* cited by examiner

TIRE CONDITION INDICATING SYSTEM FOR WHEELED VEHICLE

RELATED APPLICATIONS

The present application is based on and claims priority under 35 U.S.C. § 119 to Japanese Patent Application No. 2002-224113, field on Jul. 31, 2002, the disclosures of which is hereby incorporated by reference in its entirety.

BACKGROUND OF THE INVENTION

1. Field of the Invention

The present invention generally relates to a tire condition indicating system for a wheeled vehicle. More particularly, the present invention relates to a tire condition indicating system using a transmitter and a receiver for communication between a wheel and a frame assembly of a vehicle.

2. Description of the Related Art

Motorcycles generally comprise a frame assembly, front and rear wheels coupled with the frame assembly and an engine as a prime mover. Typically, the front wheel is steerable by a rider and the engine drives the rear wheel.

Each of the front and rear wheels normally includes a rim and a tire mounted on the rim. The tire is inflated with air. The air pressure within the tire and other conditions in connection with the tire can advantageously be detected and indicated such that the rider can check them to know if the conditions including the tire pressure are appropriate or not. For this purpose, a tire condition indicating system can be provided.

The tire condition indicating system can include a detector(s) and an indicator. The detector is located on the front or rear wheel or on both of the wheels. The indicator is located on the frame assembly. A transmitter and a receiver also are provided at the wheel(s) and the frame assembly, respectively, to remotely communicate with each other. Japanese Laid Open Publication 2002-59723 discloses a motorcycle incorporating such a tire condition indicating system.

The tire condition indicating system disclosed in the Japanese publication first detects a vehicle velocity prior to detect an air pressure in the tire. In other words, the device does not detect the air pressure unless the motorcycle is moving. Accordingly, the rider can start traveling on the motorcycle before checking the air pressure. At least during the first moment of travel, the rider feel uncomfortable if the air pressure in the tire is abnormally low. The rider can also start the motorcycle even when the tire is punctured. The rider of course can look at or touch the tire(s), and can even measure air pressure, to check whether the tires are adequately inflated; however, many riders view checking tires as a troublesome task.

SUMMARY OF THE INVENTION

One aspect of the present invention involves a tire condition indicating system that can indicate one or more tire conditions before a wheeled vehicle starts to move. Thus, in a preferred mode, a wheeled vehicle comprises a frame assembly and at least one wheel coupled to the frame assembly. The wheel includes a rim and a tire mounted on the rim. A prime mover is coupled to the frame assembly and drives the wheel. A sensor detects a condition of the tire, a transmitter transmits the condition of the tire sensed by the sensor, and a receiver receives the condition of the tire from the transmitter. A power source supplies electric power at least to the prime mover. A control device controls power supply to the prime mover so as to inhibit power supply to at least a portion of the prime mover when the tire condition is beyond preset level.

Another aspect of the invention involves a wheeled vehicle comprising a frame assembly. At least one wheel is coupled to the frame assembly. The wheel includes a rim and a tire mounted on the rim. A prime mover is coupled to the frame assembly and is drivingly connected to the wheel. A sensor detects a condition of the tire. A transmitter transmits the condition of the tire sensed by the sensor. A receiver receives the condition of the tire from the transmitter. An indicator indicates the condition of the tire received by the receiver. A power source supplies power at least to the prime mover, the receiver and the indicator and a control device controls power supply to the prime mover, the receiver and the indicator from the power source. First and second switches are interposed between the power source and the control device. The control device allows power supply to the prime mover, the receiver and the indicator when the first switch is turned on. The control device also allows power supply to the receiver and the indicator when the second switch is turned on.

In accordance with another aspect of the present invention, a wheeled vehicle comprises a frame assembly. At least one wheel is coupled to the frame assembly. The wheel includes a rim and a tire mounted on the rim. A first sensor detects a condition of the tire. A transmitter transmits the condition of the tire sensed by the first sensor. A receiver receives the condition of the tire from the transmitter. An indicator indicates the condition of the tire received by the receiver. A power source supplies power to the receiver and the indicator and a control device controls power supply to the receiver and the indicator from the power source. A switch is interposed between the power source and the control device. The control device allows power supply to the receiver and the indicator when the switch is turned on. A second sensor detects a change of a state of the frame assembly. The control device turns the switch on when the second sensor detects the change of the state of the frame assembly.

In accordance with a further aspect of the present invention, a power supply condition method is provided for a wheeled vehicle. The method comprises detecting condition of a tire, transmitting the condition of the tire, receiving the condition of the by a receiver, indicating the condition of the tire by an indicator, supplying power to a prime mover of the vehicle, the receiver and the indicator under a first condition of the vehicle, and supplying the power to the receiver and the indicator under a second condition of the vehicle.

An additional aspect of the present invention involves a power supply control method is provided for a wheeled vehicle. The method comprises detecting a condition of a tire, transmitting the condition of the tire, receiving the condition of the tire by a receiver, indicating the condition of the tire by an indicator, detecting a change of a state of the vehicle, and supplying power to the receiver and the indicator when the change of the state of the vehicle is detected.

BRIEF DESCRIPTION OF THE DRAWINGS

These and other features, aspects and advantages of the present invention will now be described with reference to the drawings of a preferred embodiment, which is intended to illustrate and not to limit the invention. The drawings comprise seven figures.

DETAILED DESCRIPTION OF PREFERRED EMBODIMENT

The following describes various aspects and features of the tire condition indicating system. It should be noted that the following discussion relates to several distinct features of the present system and not all of the features need to be present in any single embodiment of the system. Thus, some of the features may be used with other features in some applications while other applications may use only one of the features. In addition, the term "tire condition(s)" should be interpreted to include conditions other than air pressure of a tire(s), and such as, for example, a temperature of the tire(s). Moreover, the features, aspects and advantages of the system can be applied to motorcycles; however, the illustrated motorcycle is only one type of wheeled vehicle that can include one or more wheels and that can use certain aspects and features of the present tire condition indicating system.

Motorcycle

Figure 1:
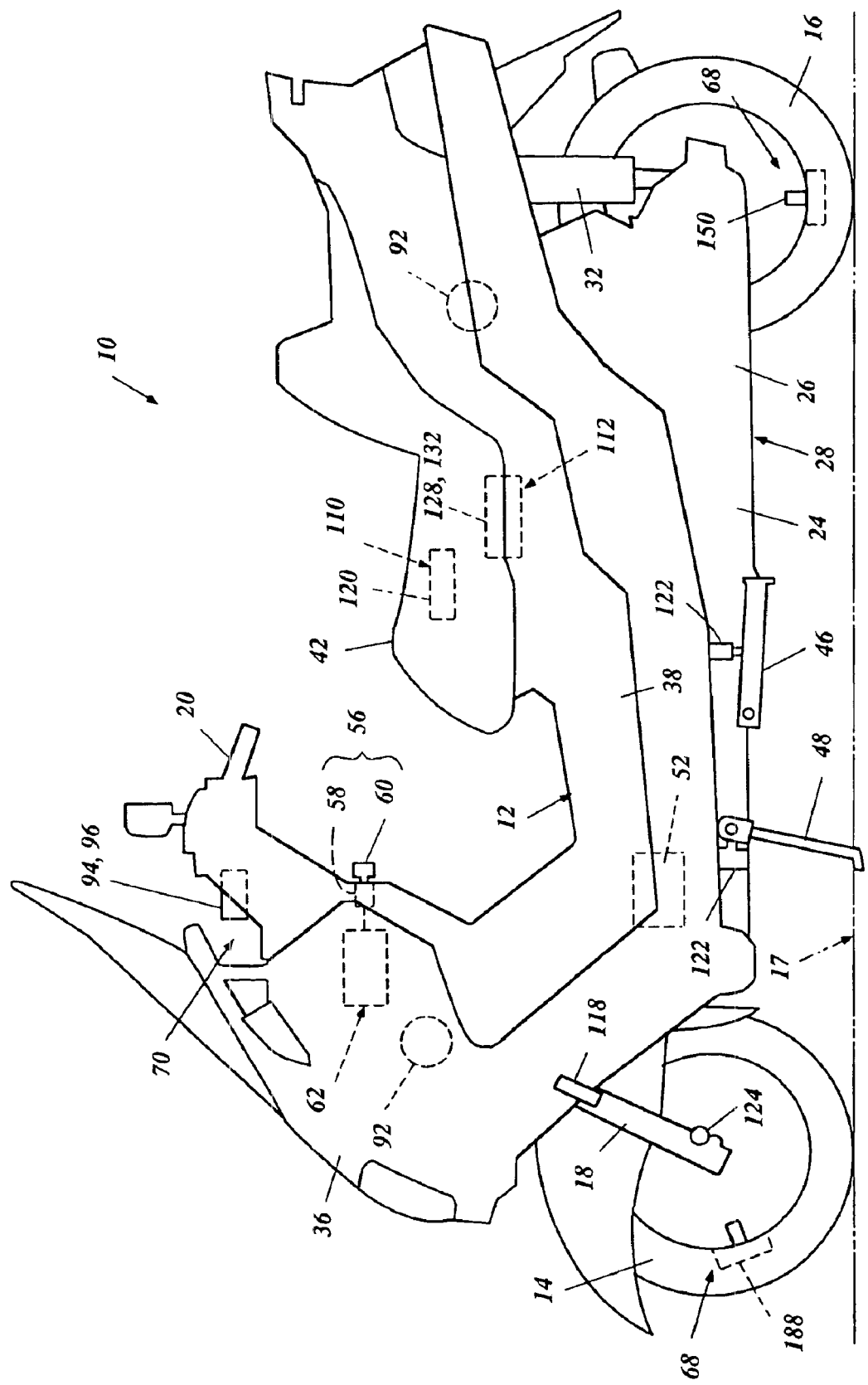
FIG. 1 is a side elevational view of a motorcycle that includes a tire condition indicating system configured in accordance with a preferred embodiment of the present invention.
Figure 2:
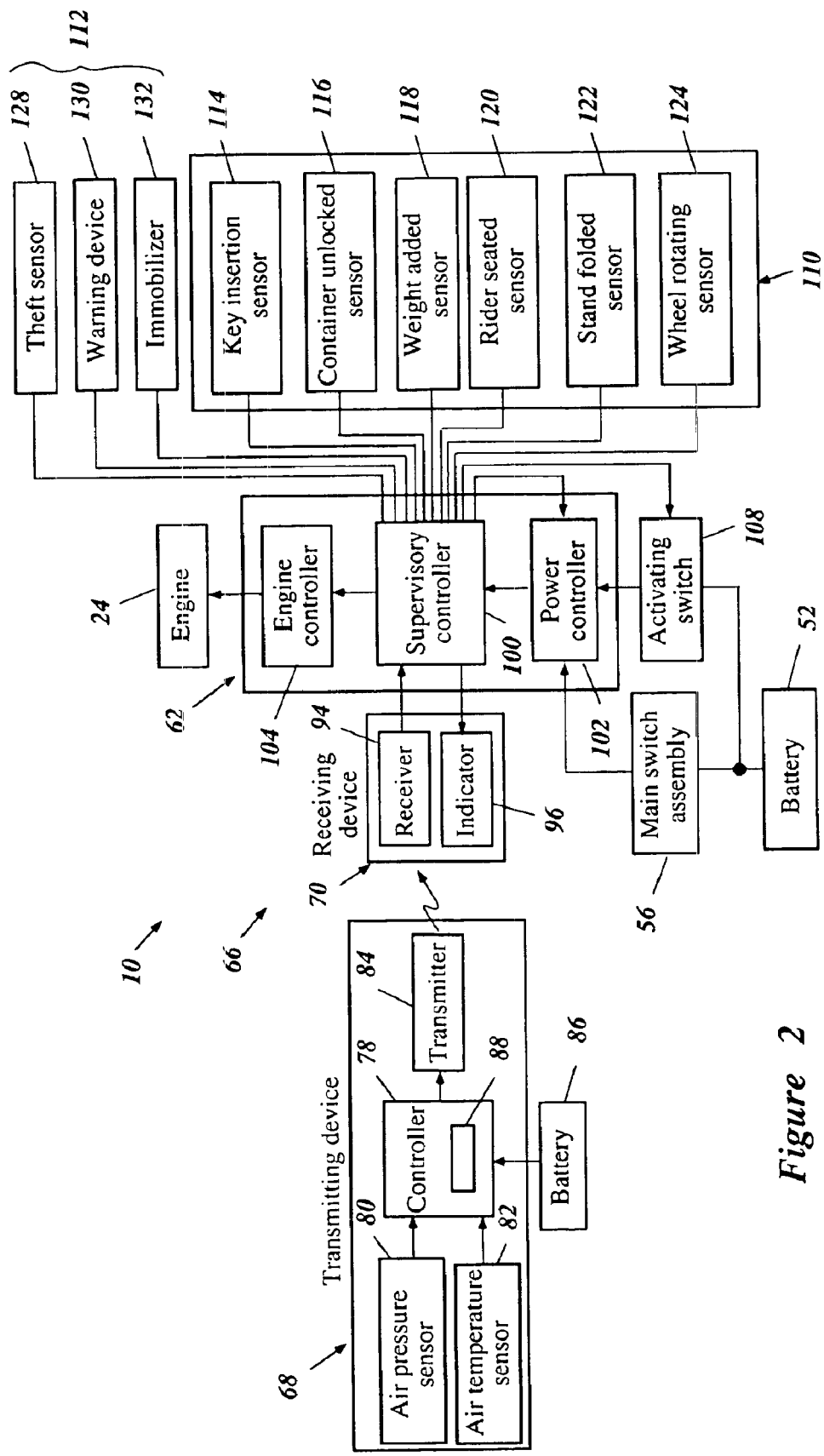
FIG. 2 is a block diagram schematically showing tire condition transmitting and receiving devices, a control device and other electrical components that are incorporated in the motorcycle of FIG. 1.

With reference initially to FIGS. 1 and 2, an overall configuration of a motorcycle that can be used with various features, aspects and advantages of the present invention will be described. A scooter type motorcycle 10 is illustrated as an example in FIG. 1.

The illustrated motorcycle 10 generally comprises a frame assembly 12 that is supported by a front steerable wheel 14 and a rear driven wheel 16. The motorcycle 10 can stand on and run relative to the ground 17 with the front and rear wheels 14, 16. The front wheel 14 depends from a set of front forks 18 that is coupled with a steering shaft. A head pipe that is connected with the frame assembly 12 pivotally supports the steering shaft. The front forks 18 are connected to a set of handlebars 20 through the steering shaft. The steering shaft can be used to control the direction of travel of the motorcycle 10. Various other rider controls can be disposed proximate the handlebars 20.

The frame assembly 12 comprises multiple frame members such as a front frame, a bottom frame and a pair of rear frames. The front frame supports the head pipe. The rear frames are connected to the front frame and extend downwardly. The rear frames are coupled with the bottom frame at this location and extend upwardly and turn rearward. Both the rear frames extend generally parallel to each other and merge together at the front frame.

A prime mover, such as, for example, but without limitation, an internal combustion engine or an electric motor unit, is mounted on the frame assembly 12. In the illustrated embodiment, the prime mover takes the form of an engine 24 that is unitarily coupled with a transmission housing 26 through a crankcase thereof. The engine 24 and transmission housing 26 together form a drive unit 28. A rear end of the drive unit 28 rotatably supports the rear wheel 16.

A set of engine brackets is affixed to the forward bottom of the drive unit 28. Each engine bracket is coupled with a link plate for pivotal movement about a pivot axis. Each link plate, in turn, is coupled with the bottom frame for pivotal movement about a pivot axis. The bottom frame through the link plates thus swingably supports the drive unit 28. A set of rear dampers (shock absorbers) 32 depend from the rear frames and are coupled with the rear end of the transmission housing 26 at brackets extending from both sides of the housing 26. The dampers 23 are affixed to the rear frames and the bracket for pivotal movement about upper and lower pivot axes, respectively. Accordingly, the drive unit 28 and the rear wheel 16 together are suspended from and coupled to the frame assembly 12.

A body panel assembly is mounted to the frame assembly 12 and comprises a number of body panels that together encase many of the moving components of the vehicle. For instance, a front panel of cowling 36 covers a front portion of the frame assembly 12 and a set of side panels 38 cover mid portions of the frame assembly 12 and preferably a rear portion thereof.

A seat 42 is provided at generally a center of the motorcycle 10 and is affixed to the rear frames. A container space can be defined below the rear of the seat 42. The container space can be used for storage of a helmet, for example. Preferably, the seat 42 or a specific cover member of the container has a lock mechanism that can be released by a key, which preferably is a main switch key described below.

The motorcycle 10 preferably has a main stand 46 and an auxiliary stand 48. The main stand 46 comprises a pair of arms that are laterally (i.e., in a side-to-side direction) spaced apart from each other and are pivotally affixed to the bottom frame. The main stand 46 has a toggle mechanism comprising a bias spring. The main stand 46 can stand on the ground 17 to hold the motorcycle 10 under a standstill condition when the arms are out of a range in which the toggle mechanism works and can be folded up toward the bottom frame assembly 12 to release the motorcycle 10 for running when the arms are kicked by the rider into the range of the toggle mechanism. The auxiliary stand 48, in turn, comprises a single arm preferably extending on the left-hand side of the frame assembly 12. The auxiliary stand 48 also has a toggle mechanism that works similarly to the toggle mechanism of the main stand 48. The auxiliary stand 48 thus can also stand on the ground 17 to hold the motorcycle 10 under the standstill condition or release the motorcycle 10 for running.

A battery 52 is placed on the frame assembly 12 to provide electric power to the engine 24 (at least some of the time) and to other electrical components, such as, for example, head, tale and brake lamps. The engine 24 has own electrical systems and units such as, for example, an ignition system and a fuel injection system. The ignition system typically includes a spark plug(s) that fires air/fuel charges in a combustion chamber(s). The fuel injection system includes a fuel injector(s) that sprays fuel which forms part of the air/fuel charges. The fuel injector normally incorporates a solenoid coil that selectively opens a spray nozzle for a given duration. A generator driven by the engine 24 preferably generates the electric power and charges the battery 52 at least under some running conditions.

The motorcycle 10 preferably has a main switch assembly 56 that can supply electric power to the engine 24 from the battery 52. The main switch assembly 56 preferably is disposed generally below the handlebars 20 and includes a lock mechanism 58 and electrical switch elements. A main switch key 60 is provided to set the lock mechanism 58 to a locked position and to release the mechanism 58 to an unlocked position. The switch elements allow the engine 24 to be started when the lock mechanism 58 is in the unlocked position. The key 60 preferably is pivotal in the lock mechanism 58 between the locked position and the unlocked position. The key 60 can be released from the lock mechanism 58 when the lock mechanism 58 is set in the locked position and the rider can carry the key 60. The illustrated key 60 can also be used to unlock the seat 42 or the cover member of the container.

A control device 62 electrically connects the main switch assembly 56, i.e., the switch elements thereof, to the engine 24. The control device 62 will be described in greater detail below.

Tire Condition Indicating System

With continued reference to FIG. 1 and additional reference to FIG. 2, a tire condition indicating system 66 preferably comprises a tire condition transmitting devices 68 and a tire condition receiving device 70. The system 66 also includes part of the control device 62.

The transmitting devices 68 preferably are disposed at the front and rear wheels 14, 16. More specifically, each transmitting device 68 is positioned within a tire 76 (FIG. 3) of the front and rear wheels 14, 16, which will be described below. The constructions of the transmitting devices 68 are the same and the following description of the transmitting device 68 in general is applicable to both the device 68 on the front wheel 14 and the device 68 on the rear wheel 16.

The transmitting device 68 preferably comprises a controller 78, an air pressure sensor 80, a temperature sensor 82, a transmitter 84, a power source 86 and a residual power sensor 88. In the illustrated embodiment, the power source is a battery 86 that supplies electric power to the controller 78 and to the sensors 80, 82 and the transmitter 84 either directly or indirectly through the controller 78. The illustrated controller 78 preferably comprises a central processing unit (CPU) that collects an air pressure signal from the air pressure sensor 80 and a temperature signal from the temperature sensor 82. The signals represent respective conditions of the tires 76 in the present embodiment.

The controller 78 can also comprise a memory and a counter. The memory stores control programs. The counter counts clock pulses. The controller 78 preferably posses the residual power sensor 88 (which in the illustrated embodiment is a residual battery power sensor) as part thereof and produces a residual battery power signal. Preferably, the residual battery power signal is a voltage signal indicative of a voltage of the battery 86

The illustrated transmitter 84 almost intermittently transmits the signals toward the receiving device 70 under control of the controller 78. In other words, the controller 78 controls the transmitter 84 using the counter and the control programs stored in the memory such that the transmitter 84 sends the tire condition signals to the receiving device 70 at intervals determined by the controller 78. An exemplary control routine of the programs will be described below with reference to FIG. 7.

The receiving device 70 preferably comprises one or more antennas 92 (FIG. 1), a receiver 94 and an indicator 96.

In the illustrated embodiment, the respective antennas 92 are positioned proximately to the front and rear wheels 14, 16 and are affixed to the frame assembly 12. The antennas 92 are electrically connected to the receiver 94. The signals from the transmitting device 68 are received by the antennas 92 and are sent to the receiver 94 through wires or other signal transmission devices. The receiver 94 communicates with the control device 62. A single antenna can replace the twin antennas 92. In this alternative, the single antenna preferably is placed at a mid position between the front and rear wheels 14, 16, where both wheels include transmitting devices 68.

The indicator 96 also communicates with the control device 62 and indicates the conditions of the respective tires 76 based upon the tire condition signals received by the receiver 94 under control of the control device 62. Preferably, the indicator 96 incorporates a memory to store the tire condition signals and indicates the tire conditions corresponding to the stored signals unless new tire condition signals are given. Alternatively, the tire condition signals can be stored in a memory of the control device 62 and the indicator 96 can indicate the tires conditions with the signals stored in this memory. Whenever the indicator 96 indicates the tire conditions stored in the memory whether in the indicator 96 or in the control device 62, the power supply to the receiver 94 can be stopped.

An exemplary visual display will be described below with reference to FIG. 6. The indicator 96, however, can take forms other than or in addition to a visual display. For example, the indicator 96 can include a device or unit that makes sound such as a buzzer.

The receiver 94 can be separately disposed from the indicator 96. For example, the receiver 94 can be positioned within a housing of the control device 62.

The control device 62 preferably comprises a supervisory or main controller 100, a power source controller 102 and an engine controller 104.

The supervisory controller 100 preferably comprises at least a central processing unit (CPU), a memory and a counter. The supervisory controller 100 controls at least the receiving device 70, the power source controller 102 and the engine controller 104. The counter counts clock pulses.

The power source controller 102 controls power supply to the electrical components on the motorcycle 10 under control of the supervisory controller 100. In the illustrated embodiment, the electric power from the battery 52 is normally supplied to the supervisory controller 100, the engine controller 104 and the electrical components of the engine 24 such as, for example, the ignition system and/or the fuel injection system through the main switch assembly 56 and the electric power controller 102.

The engine controller 104, in turn, controls engine operations of the engine 24, for example, the operations of the ignition system and/or the fuel injection system, under control of the supervisory controller 100. Additionally, the engine controller 104 can function as electronic control unit (ECU) for the engine.

In the illustrated embodiment, the tire condition indicating system 66 additionally comprises a receiving device activating switch 108 and a group of various sensors 110; however, the tire condition indicating system need not include all of the sensors. Additionally, the motor cycle preferably includes a theft prevention system 112.

The activating switch 108 preferably is an electronic switch that activates the receiving device 70 under control of the supervisory controller 100. The activating switch 108 is positioned parallel to the main switch assembly 56 between the battery 52 and the control device 62. In the illustrated embodiment, the supervisory controller 100 turns the activating switch 108 on when the supervisory controller 100 receives at least one of output signals from the group of various sensors 110. In another variation, fewer sensors (e.g., one sensor) can be used and the controller 100 turns on the activating switch 108 when a signal is received from at least one of the one or more sensors. Once the receiving device activating switch 108 is turned on, electric power from the battery 52 is supplied to the receiving device 70 through the activating switch 108, the electric power controller 102, and the supervisory controller 100, irrespective of whether the main switch assembly 56 is turned on or not in the illustrated arrangement.

In the illustrated embodiment, the supervisory controller 100 starts counting the clock pulses with the counter immediately after turning the activating switch 108 on to determine how much time elapses from that moment. Other timing devices can also be used with the controller 100. The controller 100 preferably turns the activating switch 108 off unless the rider turns the main switch assembly 56 on during a preset period of time. For example, ten minutes is preset in the controller 100 for this purpose; however, other elapse time amounts can be used with the system. The receiving device 62 thus does not significantly drain the battery 52 if the engine is not started relatively soon after one of the sensors is activated.

The illustrated supervisory controller 100 also inhibits the engine controller 104 from starting the engine 24, i.e., no electric power is supplied to the engine 24, because the power controller 102 inhibits the power supply under control of the supervisory controller 100 if the air pressure in the tire 76 is abnormally low (e.g., less than a preset pressure). In another preferred mode, the power controller 102 does not supply power if the indicator 96 does not indicate anything. In the illustrated embodiment, the indicator 96 shows the tire conditions before the rider tries to run the motorcycle 10. The rider thus is compelled to adjust the tire condition(s) (e.g., inflate the tire) before running the motorcycle 10, if an abnormal tire condition occurs.

The group of various sensors 110 in the illustrated embodiment includes sensors that can detect a change of state of the frame assembly 12. The illustrated sensors are a key insertion sensor 114, a container unlocked sensor 116, at least one weight added sensor 118, at least one rider seated sensor 120, at least one stand folded sensor 122 and at least one wheel rotating sensor 124.

The key insertion sensor 114 can detect when the rider inserts the key 60 into the lock mechanism 58 of the main switch assembly 56 and can send a key insertion signal to the supervisory controller 100. It should be noted that the rider must insert the key 60 into the lock mechanism 58 prior to setting the lock mechanism 58 in the unlocked position where the switch elements can start the engine 24.

The container unlocked sensor 116 can detect that the rider unlocks the seat 42 or the cover member of the container. When such action is detected, the sensor outputs a container unlocked signal to the supervisory controller 100.

The weight added sensor 118 can detect that at least one of the front forks 18 contracts as a result of a rider sitting on the seat 42. A sensor element that can sense a relative movement can also be used as the weight added sensor 118. The weight added sensor 118 can send a weight added signal to the supervisory controller 100. Additionally or alternatively, the weight added sensor 118 can be provided at one of the rear dampers 32 or both of the dampers 32.

The rider seated sensor 120 can detect that the rider is seated on the seat 42 and, more preferably, can detect that the weight of the rider is added to the seat 42. In a preferred mode, a sensor element that can sense a distortion caused by the weight or pressure, such as, for example, a piezoelectric pressure sensor, can be applied as the rider seated sensor 120. The rider seated sensor 120 can send a rider seated signal to the supervisory controller 100.

The stand folded sensor 122 can detect that either the main stand 46 or the auxiliary stand 48 is folded. In the illustrated arrangement, both the main and auxiliary stands 46, 48 are provided with stand folded sensors 122. A press switch can be applied as the stand folded sensor 122. The stand folded sensor 122 can send a stand folded signal to the supervisory controller 100.

The illustrated wheel rotating sensor 124 can detect that a front wheel rotates 124 relative to the front forks 18. The wheel rotating sensor 124 can be attached to one of the front forks 18. Additionally or alternatively, the wheel rotating sensor 124 can be provided at the rear wheel 16 and specifically at one of the dampers 32, for example. The wheel rotating sensor(s) 124 outputs a wheel rotating signal to the supervisory controller 100.

As noted above, the receiving device activating switch 108 can be turned on by the supervisory controller 100 whenever at least one of the sensors 114, 116, 118, 120, 122, 124 sends the respective signal to the supervisory controller 100. When this occurs, the electric power of the battery 52 is supplied to the receiving device 70 to activate the receiving device 70.

The theft prevention system 112 primarily is provided to inhibit someone from stealing the motorcycle 10. The theft prevention system 112 comprises a position change sensor or theft sensor 128, a warning device 130 and an immobilizer 132.

The position change sensor 128 can detect when the position of the frame assembly 12 is changed and sends a position change signal to the supervisory controller 100. This is done because the position of the frame assembly 12 usually moves when a thief tries to steal the motorcycle 10. In the illustrated embodiment, the supervisory controller 100 detects an "alert" condition if the main switch assembly 56 is not operated by the key 60 within a preset amount of time after the controller 100 has received the positioned changed signal from the position change sensor 128. Sensors other than the position change sensor can be applied as the theft sensor. For instance, the stand folded sensor 122 can be used together with a timer as the theft sensor. That is, the supervisory controller 100 can detect the "alert condition" if the main switch assembly 56 is not operated by the key 60 within a preset time after the stand folded sensor 122 senses that either the main or auxiliary stand 48 is folded.

The warning device 130 preferably comprises a buzzer that sounds under control of the supervisory controller 100. The supervisory controller 100 makes the warning device 130 sound when the supervisory controller 100 detects an alert condition.

The supervisory controller 100 also inhibits power supply to the engine 24 from the battery 52 if the controller 100 receives a signal from the position change sensor 128 (or other theft prevention sensor) before the main switch assembly 56 is operated by the key 60 (or the theft prevention system 112 is otherwise deactivated). In the illustrated embodiment, the controller 100 inhibits the ignition system from firing the air/fuel charges by disconnecting the ignition system from the battery 52. The controller 100 alternatively or additionally can inhibit fuel injection, starter motor operation and/or valve (e.g., throttle valve) actuation.

The immobilizer 132 holds the controller 100 in the inhibition state. The immobilizer 132 releases the controller 100 from the inhibition state when a release signal is given to the immobilizer 132. In the illustrated arrangement, the release signal is given when the rider inserts the key 60 into the lock mechanism 58 of the main switch assembly 56. Other ways of deactivating (i.e., turning off) the theft prevention system can also be used either in combination with or as an alternative to the above-described key-insertion system. For example, the key 60 can be provided with a communication unit that remotely communicates with the immobilizer 132. The rider can send the release signal to the immobilizer 132 from a remote place with this key. Further, the immobilizer 132 can be provided with an input unit for inputting a password that corresponds to the release signal. The rider can input the release signal without any key in this alternative arrangement.

In the illustrated arrangement, the release signal to the immobilizer 132 also is sent to the supervisory controller 100 and the controller 100 turns on the receiving device activating switch 108 based upon the release signal. That is, the release signal works the same as the signals of the sensors 114, 116, 118, 120, 122, 124 in that, when the controller 100 receives the signal, the controller 100 turns on the activating switch 108.

As thus described, in the illustrated embodiment, the tire condition indicating system 66 can contribute to indicate the tire conditions before the motorcycle 10 begins to move. The rider thus need not physically check the tire(s) himself or herself, but rather is alerted if attention to the tire(s) is needed (e.g., the tire needs to be inflated). Additionally, the system alerts the rider before the motorcycle 10 begins traveling to avoid that uncomfortable feeling that occurs when riding on an under-inflated tire(s). Because the illustrated activating switch 108 can be automatically turned on when one of the sensor in the group of sensors 110 detects the specific condition or the immobilizer 132 is deactivated, the rider does not have to operate the activating switch 108. However, in other embodiments, the receiving device activating switch 108 can be turned on or off manually. This can be accomplished either as a manual override to the automatic system described or as an alternative to the automatic system.

Tire Condition Transmitting Device

With continued reference to FIGS. 1 and 2 and additional reference to FIGS. 3–5, the tire condition transmitting device 68 will now be described in greater detail below.

The front and rear wheels 14, 16 each include a rim 136 that is rotatably coupled with the front forks 18 or the rear dampers 32, respectively, via a plurality of spokes. The rim 136 of the rear wheel 16, together with one of the dampers 32 on the left-hand side, also is rotatably coupled with the drive unit 28. The rim 136 preferably is made of aluminum alloy. As best seen in cross-section (see FIG. 3), the rim 136 defines a base section 138, a pair of flat sections 140 and a pair of end sections 142. The flat sections 140 extend from the base section 138 and the end sections 142 extend from the flat sections 140. A bead of the tire 76 is fitted into the end sections 142 such that peripheral edges of the tire 76 abut on an inner surface of the flat sections 140. The tire 76 thus is firmly mounted on the rim 136 and defines an inner space 146 therein. The wheel 14, 16 is generally symmetrical relative to a vertical center plane 144 that extends generally vertically and fore to aft generally along with the frame assembly 12 that also extends fore to aft. The air pressure sensor 80 detects an air pressure in the space 146 and the temperature sensor 82 detects a temperature of the air in the space 146.

An air filling unit 150 is provided to introduce air into the space 146. The air preferably is pressurized into the space 146 by an air compressor. The air filling unit 150 preferably is affixed to the base section 138. The air filling unit 150 has a center axis 152 (FIG. 4) that extends generally along the vertical center plane 144 and toward a center of the wheel 14, 16. The tire condition transmitting device 68 is affixed to an inner end of the air filling unit 150 within the space 146.

Figure 4:
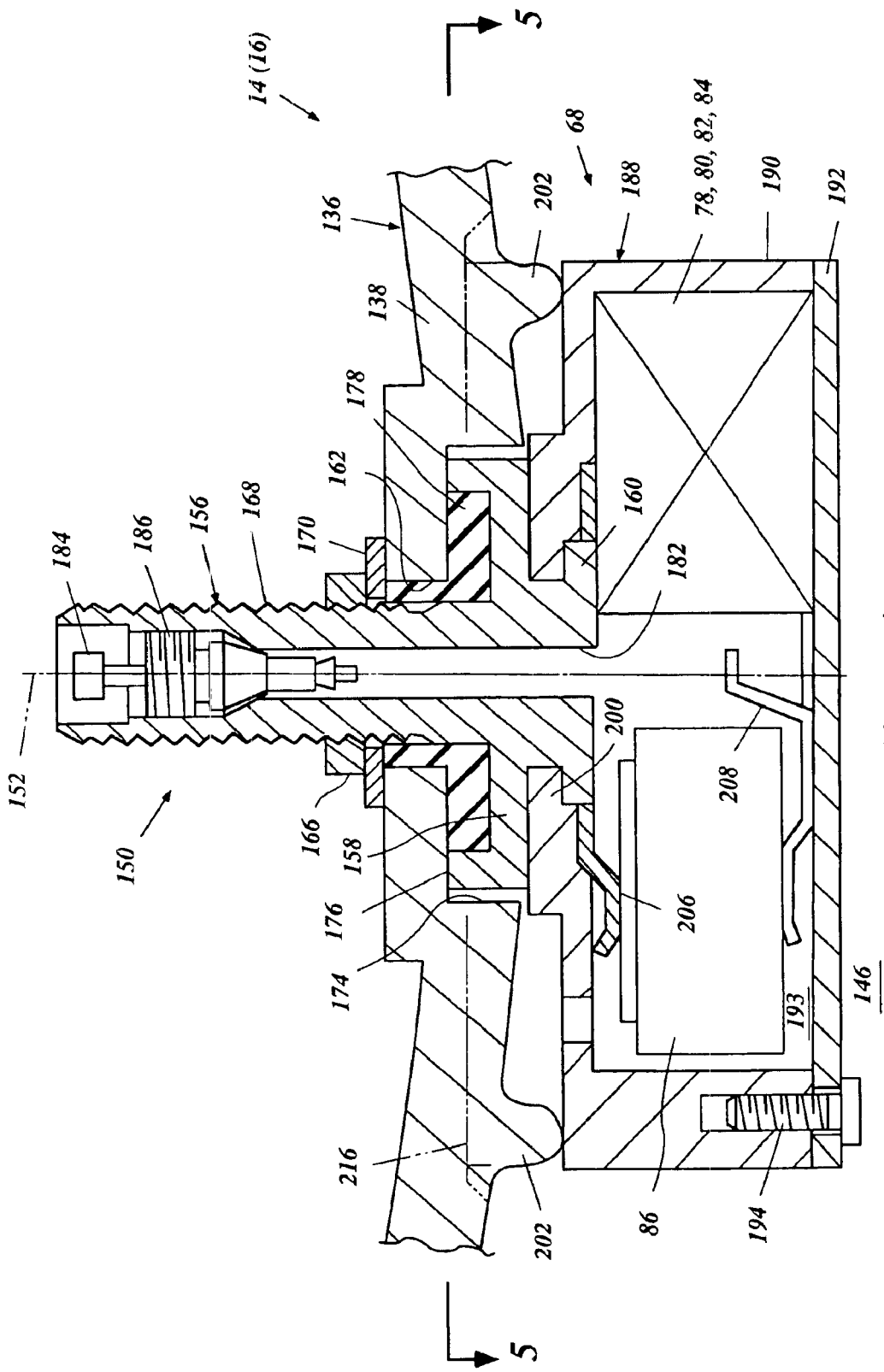
FIG. 4 is a cross-sectional and side elevational view of the transmitting device of FIGS. 2 and 3. The front or rear wheel is illustrated partially and in cross-section.
Figure 5:
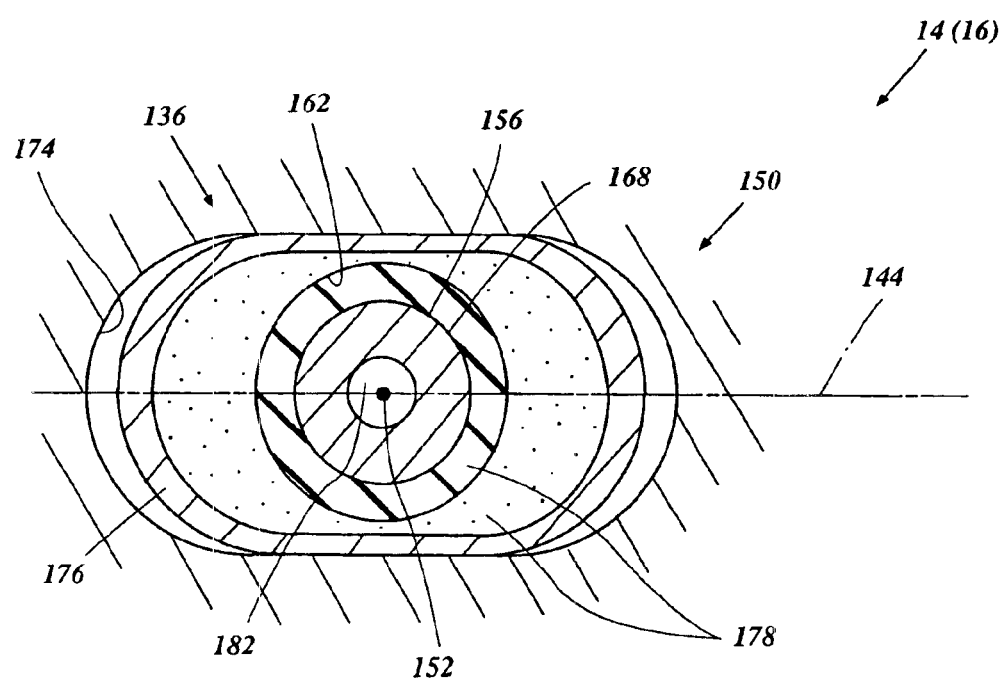
FIG. 5 is a cross-sectional view of the transmitting device taken along the line 5—5 of FIG. 4.

With particular reference to FIGS. 4 and 5, the air filling unit 150 comprises a fixing section 156, a large flange section 158 and a small flange section 160.

The fixing section 156 extends through an opening 162 defined at the base portion 138. The opening 162 has an inner diameter that is slightly larger than an outer diameter of the fixing section 156. The fixing section 156 extends generally along the center axis 152 and outwardly beyond the base portion 138. The fixing section 156 is threaded on an outer surface thereof to form a male screw or bolt configuration 168. A nut 166 is screwed down onto the threaded outer surface 168, with a washer 170 first placed on the fixing section 156, to secure the fixing section 156 to the base section 138 of the rim 136.

The large and small flange sections 158, 160 preferably extend generally radially from the center axis 152. The large flange section 158 is more proximal to the fixing section 156 than the small flange section 160 and is positioned in an oval recess 174 that is formed next to the opening 162 at the base section 138 of the rim 136. The large flange section 158 also has an oval configuration that is slightly smaller than the oval recess 174. The large flange section 158 defines an outer peripheral portion 176 that turns generally normal to the other portion of the large flange section 158 and extends toward the base section 138 of the rim 136. An elastic ring member 178 is positioned in a space defined by the base section 138, the fixing section 156 and the large flange section 158. The ring member 178 preferably is made of rubber material. The ring member 178 is tightly interposed between the rim 136 and the air filling unit 150 when the nut 166 is screwed down, and inhibits the air in the space 146 from escaping to the atmosphere.

The air filling unit 150 defines an opening 182 extending through the fixing section 156, the large flange section 158 and the small flange section 160. The space 146 communicates with the atmosphere through the opening 182. A one-way valve unit 184 is fitted, preferably screwed down, into the opening 182 at a location next to an out side end of the opening 182. The one-way valve unit 184 allows the air from the compressor to enter the space 146, while the one-way valve unit 184 inhibits the air in the space 146 from leaving the space.

The transmitting device 68 has a housing unit 188 that preferably comprises a container section 190 and a cover section 192. The container section 190 defines a cavity 193 that opens to the space 146. The cover section 192 closes the cavity 193. The illustrated cover section 192 is affixed to the container section 190 by bolts 194. The container section 190 defines at least one aperture 196 through which the cavity 193 communicates with the space 146.

The container section 190 defines a fixing flange 200 that can be interposed between the large flange section 158 and the smaller flange section 160. In other words, the housing unit 188 depends from the air filling unit 150 at the fixing flange 200. In the illustrated arrangement, the base section 138 of the rim 136 defines a pair of projections 202 spaced apart from each other in a circumferential direction of the wheel 14, 16. The projections 202 extend to the housing unit 188 and abut against a surface of the housing unit 188. In this manner, the housing unit 188 is held generally normal to the center axis 152 of the air filling unit 150.

The controller 78, the air pressure sensor 80, the temperature sensor 82, the transmitter 84 and the battery 86 are contained within the cavity 193. As noted above, the residual battery power sensor 88 is built in the controller 78 in the illustrated embodiment. The controller 78, the air pressure sensor 80, the temperature sensor 82 and the transmitter 84 preferably are gathered together to form a modular unit.

The battery 86 preferably is rechargeable. The battery 86 is grounded through a cathode element 206 that is electrically connected to the rim 136 through the air filling unit 150. An anode element 208 for the battery 86 also is provided. The anode element 208 is electrically isolated from the rim 136. An exemplary recharging construction is disclosed in a co-pending U.S. application filed on even date herewith, entitled TIRE CONDITION INDICATING SYSTEM FOR WHEELED VEHICLE, naming the same inventor as the present application and having an Attorney's docket number FY.50683US0A, the entire contents of which is hereby expressly incorporated by reference.

The foregoing battery 86 is disposed within the housing unit 188 together with the other electrical components of the transmitting device 68. Alternatively, the battery 86 can be separated from the housing unit 188 and can be electrically connected with the electrical components.

The controller 78, the air pressure sensor 80, the temperature sensor 82 and the transmitter 84 also are grounded. The battery 86 can supply electric power to those components 78, 80, 82, 84 through the anode element 208. Alternatively, the battery 86 can supply the electric power to those components 78, 80, 82, 84 through another anode element.

In the illustrated arrangement, the transmitting device 68 has no specific switches to connect or disconnect the components 78, 80, 82, 84 with the battery 86 and the battery 86 always supplies power to those components 78, 80, 82, 84. A rechargeable battery 86 thus is quite advantageous, even though the power consumption by those components 78, 80, 82, 84 is nominal.

Alternatively, the transmitting device 68 can be provided with a switch to connect or disconnect the components 78, 80, 82, 84 with the battery 86. The switch preferably is an electrical switch. For instance, the receiving device 70 can transmit a preparation completion signal to the transmitting device 68 when the receiving device 70 is ready to receive signals from the transmitting device 68. The electrical switch is activated when the switch receives the preparation completion signal and then connects the components 78, 80, 82, 84 with the battery 86. The electrical switch disconnects them unless the transmitting device 68 receives the preparation completion signal. For this purpose, of course, the system would include corresponding receivers and transmitters within the wheel and on the frame.

Figure 3:
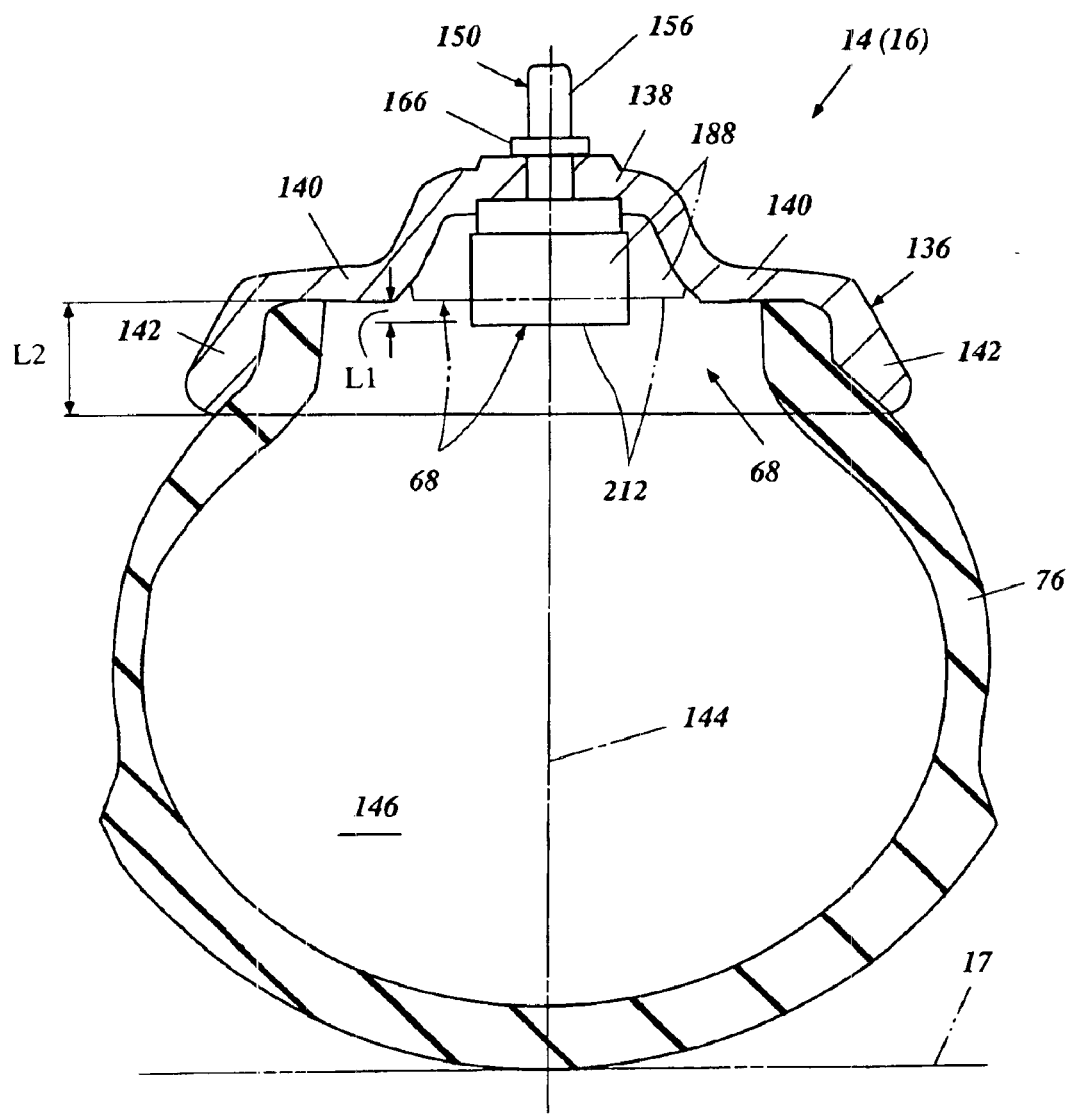
FIG. 3 is a cross-sectional and front elevational view of either the front or rear wheel of the motorcycle that incorporates the transmitting device of FIG. 2. A front view of the transmitter is illustrated in the figure.

With reference to FIG. 3, a distal end 212 (i.e., the cover section 192) of the housing unit 188, which is located opposite to the air filling unit 150, is positioned in an area defined by the rim 136 rather than an area defined by the tire 76. That is, the major portion of the housing unit 188 is confined within an area surrounded by the base section 138 and the distal end 212 slightly protrudes to an area surrounded by the end sections 142 beyond the flat sections 140. If a length of the portion that protrudes to the area surrounded by the end sections 142 is L1 and a length of the end sections 142 that protrudes from the flat sections 140 is L2, the length L1 preferably is less than a half of the length L2. Because of this arrangement, the receiving device 68 cannot be pressed against the ground in the event the tire 76 is punctured. Thus, a tire puncture is less likely to damage the receiving device 68. In addition, the receiving device 68 does not interfere with tire removal and installation processes.

In one variation, as indicated by a phantom line of FIG. 3, the housing unit 188 of the receiving device 68 can be entirely confined within the area defined by the base portion 138. The illustrated variation of the housing unit 188 fully uses the area. In another arrangement, as shown in FIG. 4, the base section 138 can defines a flat surface 216 on which a flat cathode element extends and the housing unit 188 can abut onto the flat cathode element. The distal end 22 in this arrangement can move back into the area defined by the base section 138.

Visual Display

Figure 6:
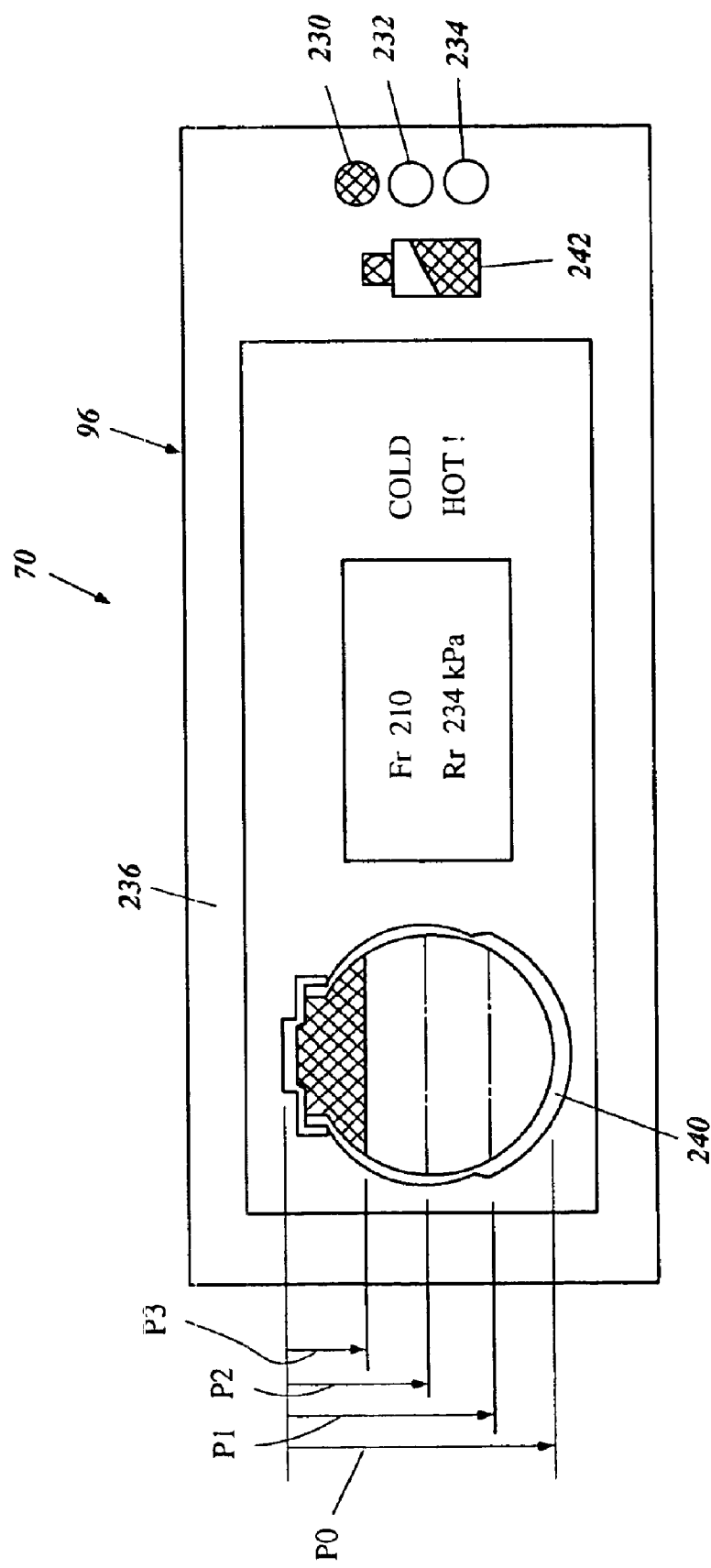
FIG. 6 is a schematic view of an indicator incorporated in the receiving device.

With reference to FIG. 6, an example of a visual display by the indicator 96 will now be described in greater detail below.

The illustrated indicator 96 has a receiver lamp 230 that is switched on when the receiver 94 receives the tire condition signals from the transmitting device 68 at least after the receiving device activating switch 108 is turned on. The receiver lamp 230 preferably is switch on after the main switch assembly 56 is turned on.

A set button 232 and a select button 234 are provided next to the receiver lamp 230. When the rider pushes the set button 232, a set of temperatures that comprises an upper limit temperature and a lower limit temperature is indicated on an indicator panel 236. The set of temperatures initially is indicated with a set number. A plurality of sets is prepared in the indicator 96 and different sets of temperatures appear on the panel 236 whenever the rider pushes the select button 234. One of the sets of temperatures is recommended by a tire manufacturer in connection with a tire that is manufactured by the manufacturer. If the actual tires 76 are different from the tire that corresponds to the set of temperature on the panel 236, the rider pushes the select button 234 to select a proper set of temperatures. In the illustrated embodiment, if the rider continues to push either the set button 232 or the select button 234 or both of them for a preset period of time, the receiving device activating switch 108 can be turned off.

The temperature of the air in the space 146 that is detected by the temperature sensor 82 is indicated in the panel 236. If the air temperature is excessively cold, a symbol "COLD" is indicated in, for example, blue. A tire containing such cold air does not have proper volume and has a coefficient of friction that is less than a coefficient of friction of a tire containing hot air. Because the motorcycle with the tires containing the cold air may slip, the symbol "COLD" preferably is maintained until the air temperature exceeds a preset low temperature. The preset low temperature can be the selected lower limit temperature. On the other hand, if the air temperature is higher than a preset high temperature, which can be the selected upper limit temperature, a symbol "HOT!" is indicated in, for example, red. Particularly, if the tire 76 is punctured or the rider brakes the motorcycle 10 often, the air temperature can abnormally increases. The indicator 96 can warn the rider of such a condition by this symbol along with a warning of an abnormal air pressure.

The air pressure detected by the air pressure sensor 80 is indicated by an icon 240 that schematically illustrates a cross-sectioned tire. Preferably, two icons 240 corresponding to the tires 76 at the front and rear wheels 14, 16 are provided, although FIG. 6 shows just one of them. Alternatively, one icon 240 can alternately indicate the air pressure of the respective tires.

The illustrated icon 240 is divided into four sections. The reference symbol P0 covers all the sections. The reference symbols P1, P2, P3 cover three fourth, a half and a quarter of the sections, respectively, as shown in FIG. 6. If the actual air pressure of the tire 76 is appropriate, all the sections illuminate. If the air pressure is approximately three fourth of the appropriate magnitude, the illumination occupies three sections corresponding to the reference symbol P1. If the air pressure is approximately a half of the appropriate magnitude, the illumination occupies two sections corresponding to the reference symbol P2. If the air pressure is approximately a quarter of the appropriate magnitude, the illumination occupies one section corresponding to the reference symbol P2. FIG. 6 illustrates the last condition. Of course, other ways to indicate air pressure conditions is also practicable (e.g., over-inflated, inflated, under-inflated).

As thus described, the reference symbols P0, P1, P2, P3 correspond to air pressures in the tire 76. In the illustrated embodiment, for example, the air pressure P0 is 200 kilo Pascal, the air pressure P1 is approximately 150 kilo Pascal, the air pressure P2 is approximately 120 kilo Pascal and the air pressure P3 is approximately 100 kilo Pascal.

Tire pressure of 200 kilo Pascal (P0) or more, but less than 250 kilo Pascal, is preferred in the illustrated embodiment. Pressure greater than 150 kilo Pascal (P1) and less than 200 kilo Pascal (P0) is acceptable. However, the air pressure less than 150 kilo Pascal (P1) is beyond an acceptable level for producing a smooth ride. Air pressure less than 120 kilo Pascal (P2) is significant, and air pressure less than 100 kilo Pascal (P2) is considered extremely low, Of course, these air pressures are merely exemplary, and other tire pressures can be used.

Preferably, the actual air pressures in the tires 76 of the front and rear wheels 14, 16 also are indicated with the number between the icon 240 and the temperature indication. The symbol "Fr 210" means that the air pressure of the front tire is 210 kilo Pascal, while the symbol "Rr 234" means that the air pressure of the rear tire is 234 kilo Pascal. The symbol "kPa" next to the symbol "Rr 234" means the unit kilo Pascal. In the illustrated embodiment, if the air pressure is less than P3, the icon 240 and either the symbol "Fr 210" or "Rr 234" or both of them flashes on and off. Of course, the pressure can be displayed in other measurement units (e.g., gauge pressure per square inch).

The residual battery power sensed by the residual battery power sensor 88 preferably is indicated with an icon 242 positioned next to the lamp 230 and the buttons 232, 234. Preferably, the entire area of the icon 242 illuminates when the residual power of the battery 86 is fully charged and the illuminating area then decreases step by step such as, for example, a half, a quarter and zero in accordance with the decrease of the residual battery power.

It should be noted that any colors other than blue and red can be selected and also any icons, marks, symbols or characters can be used for the indicator.

Control Routine Conducted by Controller

Figure 7:
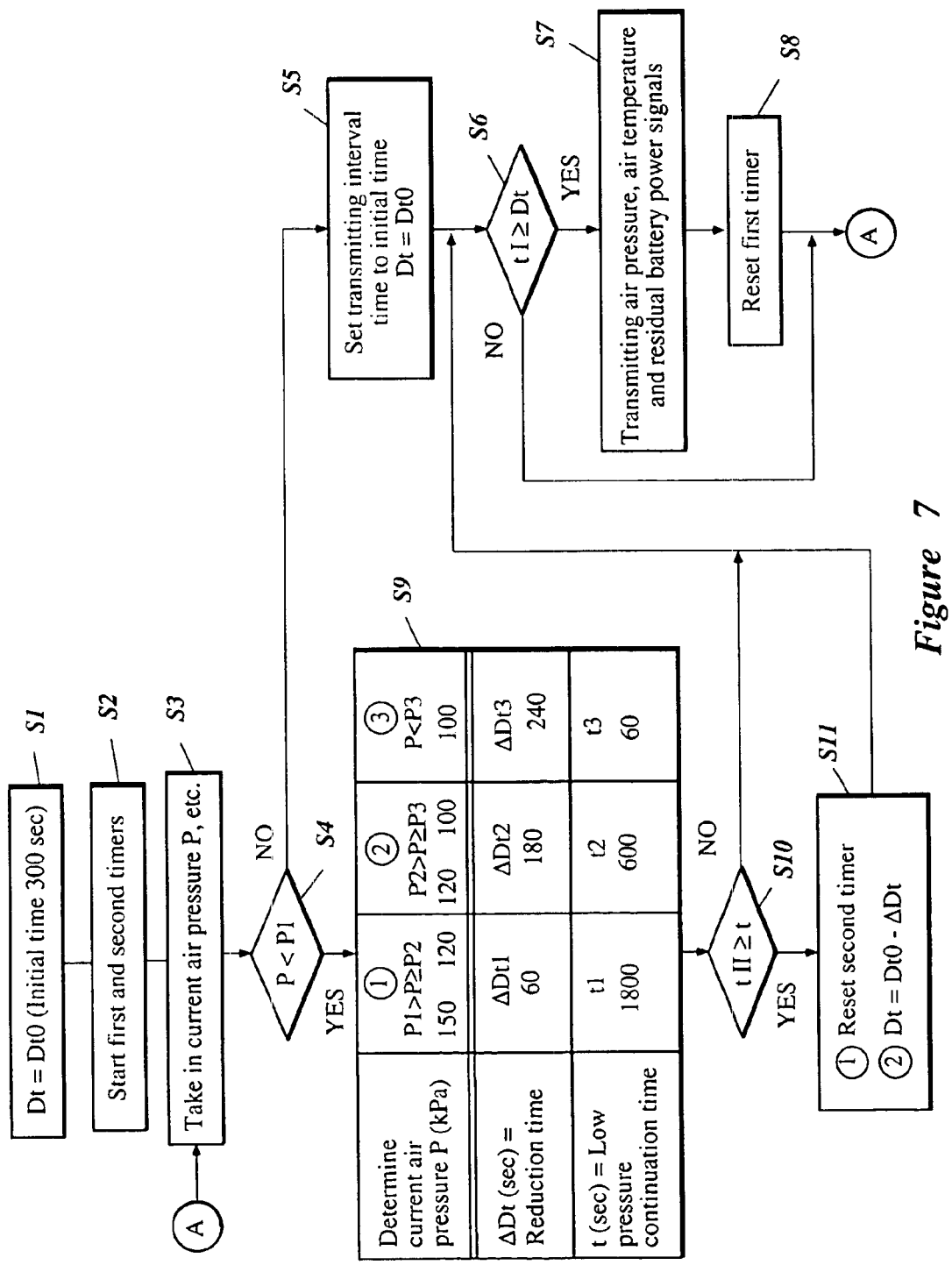
FIG. 7 is a flow chart showing a control routine of a controller in the transmitting device that sets and resets first and second timers applied for intermittent transmission by the transmitting device.

With reference to FIG. 7, an exemplary control routine conducted by the controller 78 will now be described below. The illustrated controller 78 controls the transmitter 84 using the control routine.

First and second timers tI, tII described below are not distinct timers. The controller 78, using the counter therein, can act as such timers by counting the clock pulses. However, the controller 100 of course can be provided with distinct timers. Also, air pressures P0, P1, P2, P3 described below correspond to the air pressures indicated by the reference symbols P0, P1, P2, P3, which were discussed above.

The control routine starts and proceeds to step S1. The controller 78 initially sets a relatively long period of time Dt0 as transmission intervals Dt. The set transmission intervals Dt0 preferably are 300 seconds. The control routine then goes to step S2. At step S2, the controller 78 starts the first and second timers tI, tII and proceeds to step S3.

The illustrated air pressure sensor 80, temperature sensor 82 and residual battery power sensor 88 detects the respective tire conditions and send detected signals to the controller 78. At step S3, the controller 78 samples in the most current signals. Alternatively, the controller 78 can command the respective sensors 80, 82, 88 to detect current tire conditions and to send the tire condition signals to the controller 78 at step S3.

The control routine then proceeds to step S4. The controller 78, at step S4, determines whether the current air pressure P is less than P1. If the determination is negative, i.e., the air pressure P is equal to P1 or greater than P1 (including P0), the control routine goes to step S5 and the controller 78 sets the interval time Dt as the initial intervals Dt0. Then, the control routine proceeds to step S6 to determine whether the elapsed time counted by the first timer tI is equal to or greater than the initial interval time Dt0. If the determination at step S6 is affirmative, the control routine proceeds to step S7. The controller 78, at step S7, commands the transmitter 84 to send the detected signals, i.e., the current data regarding the air pressure, air temperature and the residual battery power, to the receiving device 70. The control routine then moves to step 8 and the controller 78 resets the first time tI at step 8. Then, the control routine returns back to step S3. If the determination at step S6 is negative, the control routine returns directly back to step S3 without conducting steps S7, S8.

If the determination at step S4 is affirmative, the control routine proceeds to step S9. At step S9, the controller 78 determines whether the air pressure falls in first, second or third grades (ranges). The first grade is an acceptable level, the second grade is a less preferred level and the third grade is an even lesser preferred level. In the illustrated embodiment, the air pressures P1, P2, P3 give thresholds for the determination. That is, the first grade covers the air pressure less than pressure P1 and equal to or greater than pressure P2, the second grade covers the air pressure less than pressure P2 and equal to or greater than pressure P3, and the third grade covers the air pressure less than pressure P3.

If the air pressure falls in the first grade, the controller 78 selects a first control mode. In the first control mode, a first reduction time $\Delta Dt1$ is given that will be subtracted from the initial interval time Dt0 later. The first reduction time $\Delta Dt1$ preferably is 60 seconds. Also, a first low pressure continuation time t1 is given. The first low pressure continuation time t1 is a period of time in which the air pressure of the tire continuously stays within the first grade. The first low pressure continuation time t1 preferably is 1,800 seconds.

If the air pressure falls in the second grade, the controller 78 selects a second control mode. In the second control mode, a second reduction time $\Delta Dt2$ is given that will be subtracted from the initial interval time Dt0 later. The first reduction time $\Delta Dt2$ preferably is 180 seconds. Also, a second low pressure continuation time t2 is given. The second low pressure continuation time t2 is a period of time in which the air pressure of the tire continuously stays within the second grade. The second low pressure continuation time t2 preferably is 600 seconds.

If the air pressure falls in the third grade, the controller 78 selects a third control mode. In the third control mode, a third reduction time ΔDt3 is given that will be subtracted from the initial interval time Dt0 later. The third reduction time ΔDt3 preferably is 240 seconds. Also, a third low pressure continuation time t3 is given. The third low pressure continuation time t3 is a period of time in which the air pressure of the tire continuously stays within the third grade. The third low pressure continuation time t3 preferably is 60 seconds.

The control routine then proceeds to step S10. At step S10, if the first mode has been selected at step S9, the controller 78 determines whether an elapsed time counted by the second timer tII is equal to or greater than the first low pressure continuation time t1. Similarly, if the second or third mode has been selected at step S9, the controller 78 determines whether an elapsed time counted by the second timer tII is equal to or greater than the second or third low pressure continuation time t2 or t3, respectively.

If the determination at step S10 is negative, i.e., the elapsed time counted by the second timer tII is less than the first, second or third low pressure continuation time t1, t2, t3, the control routine goes to step S6. The controller 78 thus determines whether the elapsed time counted by the first timer tI is equal to or greater than the initial interval time Dt0.

If, on the other hand, the determination at step S10 is affirmative, the control routine goes to step S11. The controller 78, at step S11, resets the second timer tII and calculates the interval time Dt using the following equation:

$$Dt=Dt0-\Delta Dt$$

For example, if the controller 78 selects the first mode, the interval time Dt will be 240 seconds (=300−60).

Then, the control routine proceeds to step S6. At step S6, the controller 78 determines whether the elapsed time counted by the first timer tI is equal to or greater than the time calculated at step S11. If the determination is affirmative, the control routine goes to step S7. In the meantime, if the determination is negative, the control routine goes back to step S3. Accordingly, all the interval time Dt under the first, second and third modes is shorter than the initial duration time Dt0. In addition, the more significant the air pressure loss of the tire, the shorter the interval time Dt. For example, in the illustrated embodiment, the interval times in the first, second and third control modes are 240 seconds, 120 seconds and 60 seconds, respectively.

The supervisory controller 100 commands the indicator 96 to show the current tire condition whenever the receiver 94 receives the signals from the transmitter 84. The rider thus can easily recognize that the air pressure is low by the frequent indication. In addition, the frequency of the indication depends on the grade of the tire conditions. Accordingly, the rider can easily grasp the respective conditions in response to the grades and is prompted to take the necessary action (e.g., inflate the tire).

As described above, a buzzer or any other sound alarms can additionally or alternatively sound to inform the rider of a less than preferred tire condition. The frequency or loudness of the sound can be changed in response to the grade.

Preferably, the supervisory controller 100 also controls the engine operation under such conditions. For example, the controller 100 can slow down the engine speed when less than preferred conditions occur and can even stop the engine operation under the extreme conditions. Intentional misfiring of the ignition system or altering the fuel injection timing, duration or pressure can be used to slow down the engine, for example.

The foregoing controller 78 changes the interval time of the transmission from the transmitter 84 based upon the condition of the air pressure. In some arrangements, however, the controller 78 can change the interval time based upon the condition of the air temperature or the residual battery power.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combination or sub-combinations of the specific features and aspects of the embodiments may be made and still fall within the scope of the invention. For example, additional embodiments of a control routine for the ECU can be formed by combining various steps of the disclosed routines, as will be apparent to those skilled in the art. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A wheeled vehicle comprising a frame assembly, at least one wheel coupled to the frame assembly, the wheel including a rim and a tire mounted on the rim, a prime mover coupled to the frame assembly and drivingly connected to the wheel, a sensor detecting a condition of the tire, a transmitter transmitting the condition of the tire sensed by the sensor, a receiver receiving the condition of the tire from the transmitter, an indicator indicating the condition of the tire received by the receiver, a power source supplying electric power at least to the prime mover, the receiver and the indicator, a control device controlling power supply to the prime mover, the receiver and the indicator from the power source, and first and second switches interposed between the power source and the control device, the control device allowing power to be supplied to the prime mover, the receiver and the indicator when the first switch is turned on, the control device allowing power to be supplied to the receiver and the indicator when the second switch is turned on.

2. The vehicle as set forth in claim 1 additionally comprising a second sensor detecting a change of a state of the frame assembly, the control device turning the second switch on when the second sensor detects the change of the state of the frame assembly.

3. The vehicle as set forth in claim 2, wherein the frame assembly comprises at least one component, and the change of the state of the frame assembly includes a change of a state of the component by an operator of the vehicle.

4. The vehicle as set forth in claim 1, wherein the control device includes a timer calculating elapse of time, and the control device inhibits the power supply at least to the indicator if the first switch is not turned on during a preset period of time after the indicator begins indicating the condition of the tire.

5. The vehicle as set forth in claim 4, wherein the control device inhibits the power supply to the prime mover when the power supply to the indicator is inhibited.

6. The vehicle as set forth in claim 1, wherein the condition of the tire includes an air pressure of the tire, the sensor senses the air pressure of the tire, and the control device inhibits power supply to the prime mover when the air pressure of the tire is less than a preset pressure.

7. The vehicle as set forth in claim 1, wherein the control device inhibits power supply to the prime mover when the control device also inhibits power supply to the indicator.

8. The vehicle as set forth in claim 1 additionally comprising a theft detection sensor, the control device inhibiting the power supply to the prime mover when the theft sensor detects a change in vehicle condition, and an immobilizer holding the control device in the inhibition state, the immobilizer releasing the control device when a release signal is given to the immobilizer, and the control device turning the second switch on when the control device is released from the inhibition state.

9. The vehicle as set forth in claim 8, wherein the theft sensor includes a position change sensor that detects when a position of the frame assembly is changed, the control device responses when the position change sensor detects that the position of the frame assembly is changed without the first switch turned on.

10. The vehicle as set forth in claim 1, wherein the first and second switches are disposed in parallel to each other.

11. The vehicle as set forth in claim 1 additionally comprising a second power source supplying electric power at least to the sensor and the transmitter.

12. A wheeled vehicle comprising a frame assembly, at least one wheel coupled to the frame assembly, the wheel including a rim and a tire mounted on the rim, a first sensor detecting a condition of the tire, a transmitter transmitting the condition of the tire sensed by the first sensor, a receiver receiving the condition of the tire from the transmitter, an indicator indicating the condition of the tire received by the receiver, a power source supplying electric power to the receiver and the indicator, a control device controlling power supplied to the receiver and the indicator from the power source, a switch interposed between the power source and the control device, the control device allowing power supply to the receiver and the indicator when the switch is turned on, and a second sensor detecting a change of a state of the frame assembly, the control device turning the switch on when the second sensor detects the change of the state of the frame assembly.

13. The vehicle as set forth in claim 12, wherein the frame assembly comprises at least one component, the change of the state of the frame assembly includes a change of a state of the component by an operator of the vehicle.

14. The vehicle as set forth in claim 12, wherein the control device includes a timer calculating elapse of time, and the control device inhibits the power supply to the indicator if the switch is not turned on during a preset period of time after the indicator begins indicating the condition of the tire.

15. The vehicle as set forth in claim 12, wherein the condition of the tire includes an air pressure of the tire, and the first sensor senses the air pressure of the tire.

16. A control method for a wheeled vehicle comprising detecting a condition of a tire, transmitting the condition of the tire, receiving the condition of the tire by receiver, indication the condition of the tire by an indicator, supplying electric power to a prime mover of the vehicle, the receiver and the indicator under a first condition of the vehicle, supplying the electric power to the receiver and the indicator under a second condition of the vehicle, calculating elapse of time, determining whether the vehicle is under the first condition, and inhibiting the power supply to the indicator if the vehicle is not under the first condition during a preset period of time after the indicator begins indicating the condition of the tire.

17. A power supply control method for a wheeled vehicle comprising activating a first switch to supply electric power to a receiver and an indicator, detecting a condition of a tire, transmitting the condition of the tire, receiving the condition of the tire by the receiver, indicating the condition of the tire by the indicator, detecting a change of a state of the vehicle, and independently of the first switch supplying electric power to the receiver and the indicator when the change of the state of the vehicle is detected.

18. The power supply control method as set forth in claim 17 additionally comprising activating a second switch in response to the detection of the change of the state of the vehicle, the power supply to the receiver and the indicator being caused by activating the second switch without having to activate the first switch.

19. The power supply control method as set forth in claim 17 additionally comprising sensing a physical change of a component of the vehicle to detect the change of the state of the vehicle.

20. The power supply control method as set forth in claim 17 additionally comprising supplying electric power to a prime mover of the vehicle, calculating elapse of time, and inhibiting the power supply to the indicator if the prime mover is not started during a preset period of tune after the indicator begins indicating the condition of the tire.

21. A power supply control method for a wheeled vehicle comprising detecting a condition of a tire, transmitting the condition of the tire, receiving the condition of the tire by a receiver, indicating the condition of the tire by an indicator, supplying electric power to a prime mover of the vehicle, the receiver and the indicator under a first condition of the vehicle, determining the first condition when a member which is detachable from the vehicle is attached to the vehicle and is set to an operable position of the prime mover, the receiver and the indicator, supplying the electric power to the receiver and the indicator under a second condition of the vehicle, detecting a change of a state of the vehicle, and determining the second condition when the change of the state of the vehicle is detected with the member being detached from the vehicle.

* * * * *

UNITED STATES PATENT AND TRADEMARK OFFICE
CERTIFICATE OF CORRECTION

PATENT NO. : 6,888,450 B2
DATED : May 3, 2005
INVENTOR(S) : Kaoru Sasaki et al.

It is certified that error appears in the above-identified patent and that said Letters Patent is hereby corrected as shown below:

Column 18,
Line 6, after "tire by" insert -- a --.
Line 7, replace "indication" with -- indicating --.
Line 41, replace "tune" with -- time --.

Signed and Sealed this

Twenty-seventh Day of December, 2005

JON W. DUDAS
*Director of the United States Patent and Trademark Office*